United States Patent [19]

Beyers, Jr. et al.

[11] Patent Number: 4,808,992

[45] Date of Patent: Feb. 28, 1989

[54] COMPONENT AUDIO/VIDEO SYSTEM WITH AUTOMATIC TURN-OFF OF PERIPHERAL DEVICES

[75] Inventors: Billy W. Beyers, Jr., Greenfield; James E. Hailey, Indianapolis, both of Ind.

[73] Assignee: RCA Licensing Corporation, Princeton, N.J.

[21] Appl. No.: 47,881

[22] Filed: May 8, 1987

[51] Int. Cl.[4] .............................................. H04Q 3/00
[52] U.S. Cl. .............................. 340/825.24; 358/181; 358/335
[58] Field of Search .................... 340/825.06, 825.07, 340/825.22, 825.24, 825.25; 455/4, 5, 353; 358/181, 188, 189, 194.1, 335; 360/74.1, 33.1

[56] References Cited

U.S. PATENT DOCUMENTS

| | | | |
|---|---|---|---|
| 3,922,641 | 11/1975 | Gates, Jr. ............................ | 340/825.5 |
| 4,279,012 | 7/1981 | Beckedorff et al. ............ | 340/825.22 |
| 4,337,480 | 6/1982 | Bourassin et al. ................. | 358/93 |
| 4,400,735 | 8/1983 | Strammello, Jr. .................. | 358/181 |
| 4,418,333 | 11/1983 | Schwarzbach et al. ......... | 340/825.22 |
| 4,488,179 | 12/1984 | Kruger et al. ...................... | 358/181 |
| 4,527,204 | 7/1985 | Kozakai et al. .................... | 360/33.1 |
| 4,581,645 | 4/1986 | Beyers, Jr. ........................... | 358/181 |
| 4,628,370 | 12/1986 | Fukuoka .............................. | 360/74.1 |
| 4,631,601 | 12/1986 | Brugliera et al. .................. | 358/335 |
| 4,649,428 | 3/1987 | Jones et al. ......................... | 358/194.1 |

FOREIGN PATENT DOCUMENTS 0129286 12/1984 European Pat. Off. ..... 340/365 VL

OTHER PUBLICATIONS

R. A. Pitsch, "Dimensia, The Next Dimension of Sight and Sound," *RCA Engineer,* Jul./Aug. 1985, pp. 66–70.

*Primary Examiner*—John W. Caldwell, Sr.
*Assistant Examiner*—Edwin C. Holloway, III
*Attorney, Agent, or Firm*—Eugene M. Whitacre; Paul J. Rasmussen; Peter M. Emanuel

[57] ABSTRACT

A component audio/video system includes a system controller coupled to supply selection and control commands to a plurality of peripheral audio/video devices and to receive status messages therefrom. The devices may be selected to form a number of different recording configurations involving combinations of one or more recording signal sources and one or more devices for recording the signals. The system controller enters one of a number of different control modes for turning power off to the signal sources and recording devices depending on the status messages identifying recording configurations to enable continued recording by some devices when others run out of recording or playback media.

3 Claims, 2 Drawing Sheets

COMPONENT AUDIO/VIDEO SYSTEM WITH AUTOMATIC TURN-OFF OF PERIPHERAL DEVICES

FIELD OF THE INVENTION

This invention relates to home entertainment systems of the type employing component audio and/or audio/video peripheral devices and particularly to systems in which interconnection among various devices is effected by means of a central control unit.

BACKGROUND OF THE INVENTION

A wide variety of audio only and audio/video components is presently commercially available thus giving a user a number of interconnection possibilities to create a home entertainment system personalized to his own particular desires.

One method for interconnection of these various components is to manually connect cables between those components which are presently to be used and to manually change the cable connections when it is desired to use other components. One disadvantage of this method is that the cables must be re-arranged each time it is desired to change the system configuration. Moreover, a manual wiring change requires some knowledge of the individual component details, something a child or a guest may not possess.

An alternative to manually rewiring a component video system for changing the system configuration is described by Strammello, Jr. in U.S. Pat No. 4,400,735 entitled MULTI-COMPONENT VIDEO SYSTEM CONTROLLER. In this system, manually operated pushbutton selectors provide D.C. control voltages to a matrix of electronic RF switches to permit the simultaneous viewing and recording of video signals from various sources in different combinations. Notwithstanding its advantages, the manual RF switching system lacks the facility for interconnecting audio-only devices or baseband video devices. Moreover, overall system control requires operation of the controls of each individual device plus the manual control for the RF switch matrix.

A two-component TV-VCR system featuring RF and baseband switching controlled by a common remote control is described by Kozakai et al. in U.S. Pat. No. 4,527,204 entitled REMOTE CONTROL SYSTEM. The TV receiver and the VCR each include respective remote control receivers for controlling RF and baseband video switching as well as the normal operating modes of the TV and VCR. A single hand-held remote control unit controls all operational aspects of both devices as well as selecting desired interconnections. Such a system, however, is not readily adaptable for expansion to include additional components and has no provision for inclusion of audio-only devices in a comprehensive unified home entertainment system.

It has been recognized that a large number of audio/video and audio-only devices may be combined in a unified home entertainment system by providing a central control unit coupled via a digital data bus to individual device of the system. An example of such a system is described by B. W. Beyers, Jr. in U.S. Pat. No. 4,581,645 entitled DISTRIBUTED SWITCHED COMPONENT AUDIO/VIDEO SYSTEM. Other examples include U.S. Pat. No. 4,337,480 of Bourassin et al. entitled, DYNAMIC AUDIO-VIDEO INTERCONNECTION SYSTEM and U.S. Pat. No. 4,488,179 of Kruger et al. entitled TELEVISION VIEWING CENTER SYSTEM. R. A. Pitsch describes a bus-oriented system in an article entitled "Dimensia: The Next Dimension of Sight and Sound" published in RCA Engineer, July/August edition, 1985, at pp.66–70. In the described system the control bus provides two-way communication between a central controller and a plurality of individual device controllers. By this feature a user may transmit a status request and receive a response (displayed on the screen of his TV receiver) that gives the status (e.g., play, pause, etc.) of any selected device in his system. The user may also transmit commands via the two-way data bus to select and control the "status" or operating mode of individual audio and video peripheral devices connected to the bus.

It is known that one may provide timed control of a VCR, for example, by including a clock circuit in the VCR for initiating functions such as recording time periods and channel selection at times determined by the clock. It has been recognized by Brugliera et al. in U.S. Pat. No. 4,631,601 entitled TIME PROGRAMMABLE CONTROL SYSTEM FOR A CONVERTER/VCR SYSTEM that an additional clock is needed for timed operation of a VCR from a cable TV converter. This is because cable converters manually provide an output signal on channel 3 or 4. Accordingly, to change channels at a programmed time an additional clock is necessary for the converter to provide channel selection with the recorder clock being used to select the converter output channel and recording times. In the Brugliera et al. system the extra clock is included in a remote control transmitter which supplies command signals to the cable decoder on a user determined time schedule for controlling the converter time and channel selection operation to correspond to the recording time schedule established for the VCR. Brugliera et al. caution that in their two clock system the user must take care that the clock in the VCR and the converter clock are in agreement. A lack of clock synchronization will result in a spoiled or missed recording.

SUMMARY OF THE INVENTION

It is recognized herein that it would be desirable in component audio/video systems of the general type described to automatically turn the power off for recording components under certain circumstances, e.g., when a recording signal source or recording device runs out of media (e.g., end of tape or disc). Automatic shut-off can present a problem, however, in complex audio video systems having multiple signal sources and multiple recording devices. For example multiple signal sources and recording devices may be operating simultaneously. It may be desirable, for example, to record from an audio source to audio recorders at the same time one is also recording from video devices to video recorders. Other combinations are possible such as recording from a television receiver to both an audio recorder and a video recorder. Another possible system configuration would be to record video from a TV receiver with stereo sound from an AM/FM tuner. This is useful for recording TV/FM stereo simulcast recordings, for example. In view of the large number of possible recording configurations possible, it is recognized herein that a need exists for providing automatic power turn-off control which takes into account the numerous possible recording configurations obtainable with present day component audio/video systems. The present invention is directed to meeting this newly discovered need.

A component audio video system embodying the invention comprises a system controller having an input/output port adapted for connection to a plurality of audio/video components via a bi-directional data bus for supplying selection commands and control commands to the components. A signal switching means responsive to the selection commands transmitted by the system controller via the bus selectively interconnects audio and video inputs and outputs of the components. A status transmitting means in the components transmits status messages via the bus to the system controller indicative of which of the components are selected for operation and the operating mode thereof. The messages also identify components selected for recording and components selected for supply signals to be recorded. The system controller has a first operating mode in which the controller is responsive to the messages for transmitting a power-off command to each single recording component and to each associated recording signal source supplying recording signal to the single recording component in response to a stop status message produced by any of the components. The controller has a second operating mode for transmitting a power-off command to one of two or more recording components receiving recording signal from a common recording signal source in response to a stop status message produced by the one recording component.

In accordance with a further aspect of the invention, the controller is further responsive in the second operating mode for transmitting a power-off command to the common recording signal source and to each one of the two or more recording components in response to a stop status message produced by the common recording signal source.

BRIEF DESCRIPTION OF THE DRAWING

The foregoing and further features of the invention are illustrated in the accompanying drawing wherein.

DETAILED DESCRIPTION

Figure 1:
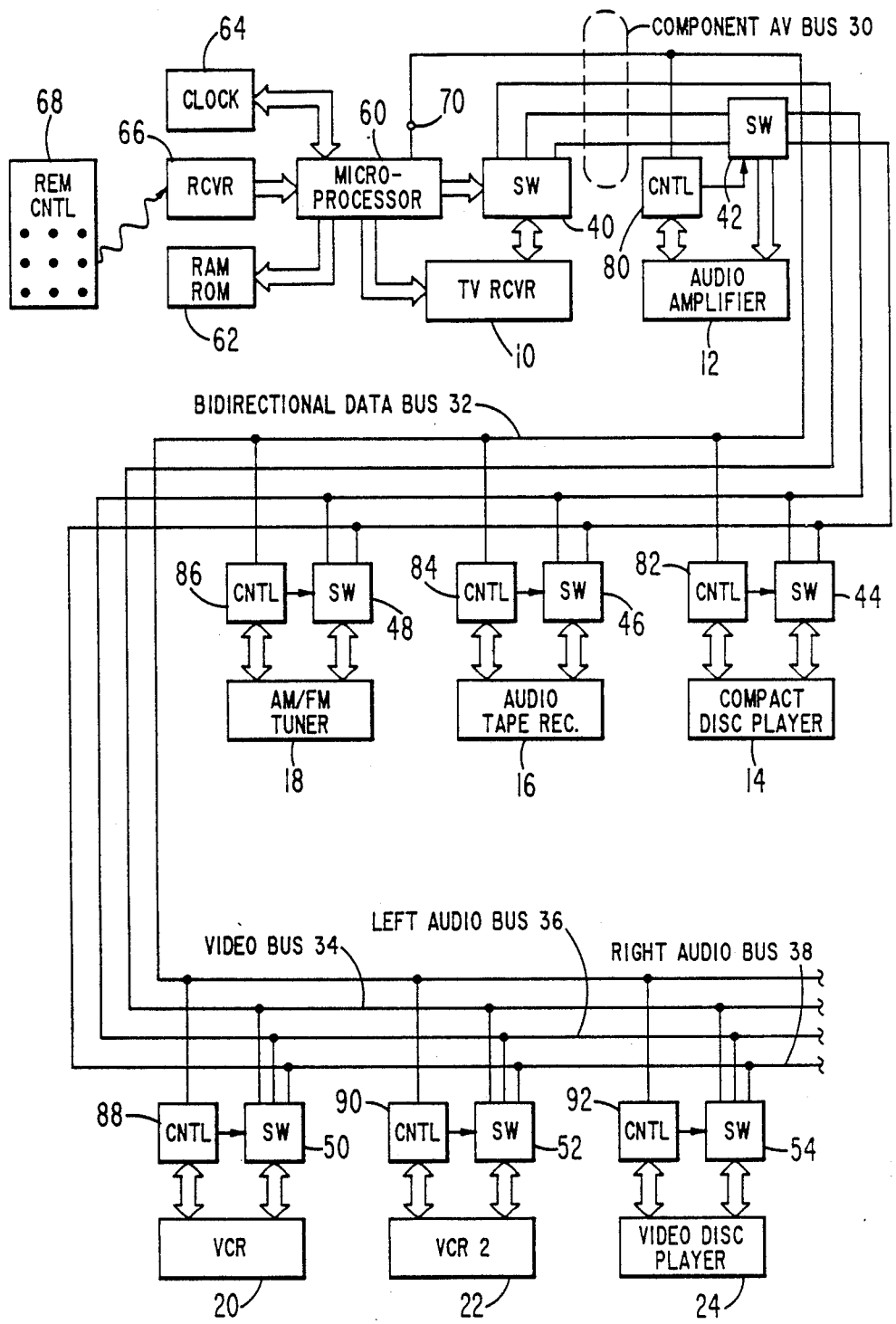
FIG. 1 is a block diagram of a component audio/video system embodying the invention.

The component audio/video system of FIG. 1 includes a television receiver 10, an audio amplifier 12, a compact audio disc player 14, an audio tape recorder 16, an AM/FM receiver 18, a pair of video cassette recorders 20 and 22 and a video disc player 24. The various devices are coupled together to form a system by means of a component audio/video bus 30 comprised of four individual buses, namely, a bidirectional data bus 32, a video bus 34, a left channel audio bus 36 and a right channel audio bus 38. As described in the aforementioned patent of B. W. Beyers, Jr., (incorporated herein by reference) the use of "daisy chain" type of bus structure as shown advantageously simplifies the addition, deletion or replacement of peripheral devices in the system and avoids the maze of wiring characteristic of systems which employ a central switch matrix (rather than distributed switches) for device coupling. The principles of the present invention apply to bus controlled component system of either type.

The audio and video inputs and outputs of devices 10-24 are coupled to the audio and video bus conductors 34, 36 and 38 by means of switches 40-54 which are controlled as will be explained. Switch 40 provides two-way coupling of audio and video signals to receiver 10 to enable the receiver to act as a signal source for supplying signals to the bus 30 or as a signal receiver or "sink" to receive audio and video signals from the bus. Switches 50 and 52 of VCR 20 and VCR 22 are also "two-way" switches which can coupled audio and video outputs to the bus to act as a signal source device or, alternatively, they couple the VCR inputs to the bus for purposes of recording. An open condition of the switch isolates a non-used device from the bus. Video disc player 24 is coupled to bus 30 by a "one-way" switch 54 since it only has audio and video outputs and thus can serve only as a signal source for the bus. The "audio-only" peripheral devices 14, 16 and 18 are coupled to the audio conductors (36, 38) of bus 30 via one-way switch 44, two way switch 46 and one-way switch 48, respectively. As with the video devices, different switch types are used because, the disc player 14 and tuner 18 can only act as signal sources whereas the audio tape recorder 16 can act as either a signal source or a signal sink. Switch 42 of audio amplifier 12 differs from the other switches in that it is in series with the audio conductors 36 and 38. Switch 42 thus enables the audio bus (36, 38) to be bifurcated or "split" into two portions. This enables audio from TV receiver 10 to be supplied to the inputs of amplifier 12 while other functions (e.g., audio or video duplication) to be performed. As an example, assume that a user wishes to view a TV program, listen to the sound via amplifier 12 and copy a video tape from VCR 20 to VCR 22. For this mode switch 40 would be set to decouple the TV video signal from bus 34 and to couple the TV audio signals to bus 36 and 38. Switch 42 would be set to couple the audio signals from the TV to the amplifier 12 inputs. This isolates the TV audio signals from the remainder of the audio bus. Finally, switches 50 and 52 would be activated to couple the audio and video output signals of VCR 20 to the inputs of VCR 22. There are a number of such possible switch configurations thereby allowing the user a wide choice of audio and video functions that may be performed simultaneously.

Overall control of switch 40-54 and selection of the operating modes of audio/video devices 10-24 is controlled by a system controller comprising a microprocessor 60 having a memory (RAM, ROM) 62, a master system clock 64 and a remote control receiver 66 coupled thereto. A remote control transmitter 68 is provided for supplying user selected commands to microprocessor 60 via receiver 66. In a presently preferred application of the principles of the invention the microprocessor 60, system clock 64, memory 62 and receiver 66 are physically located within the receiver housing (not shown). Alternatively, these devices may be in a separate module if desired. The memory (RAM and ROM) 62 for microprocessor 60 may be internal to the device. It is shown as being external here for purposes of clarity. Microprocessor 60 is coupled to directly control the operating modes of receiver 10 and switch 40 and includes an input/output port 70 coupled to the bidirectional control bus 32 for controlling the remainder of the peripheral devices 12-24 and bus switches 42-54 in the system. This is facilitated by providing each peripheral device 12-24 with an individual controller 80-92 which, preferably, are also microprocessors or so-called "one-chip" microcomputers.

In operation of the portion of the system described thus far, the user sends device selection and operating mode control command information to system controller 60 by depressing keys on remote control unit 68 which, in turn, transmits the commands to a selected peripheral audio/video device (12-24). The "slave" or remote control processors 80-92 acknowledge receipt of messages from the "master" system controller by transmitting a status message back to the master system controller 60 via the bit-directional data bus 32. R. A. Pitsch in the aforementioned article describes a suitable bus communication protocol. The status information returned via bus 32 may be displayed on the screen of TV receiver 10 for informing the user of the current operating modes of the selected peripheral device.

In accordance with an aspect of the invention the status message provided by the peripheral device controller 80-92 include source flags for identifying components that are selected by controller 60 for recording and SINK flags for identifying components that are selected by controller 60 for supplying recording signals to be selected recording devices. The term "selected" means those devices that are coupled to the audio and/or video lines of bus 30 in response to commands from controller 60. As used herein, components serving as sources of video signal for recording are designated VSRC and those serving as sources of audio signal for recording are designated ASRC. These abbreviations are used in the flow chart of FIG. 2 as will be explained.

Figure 2:
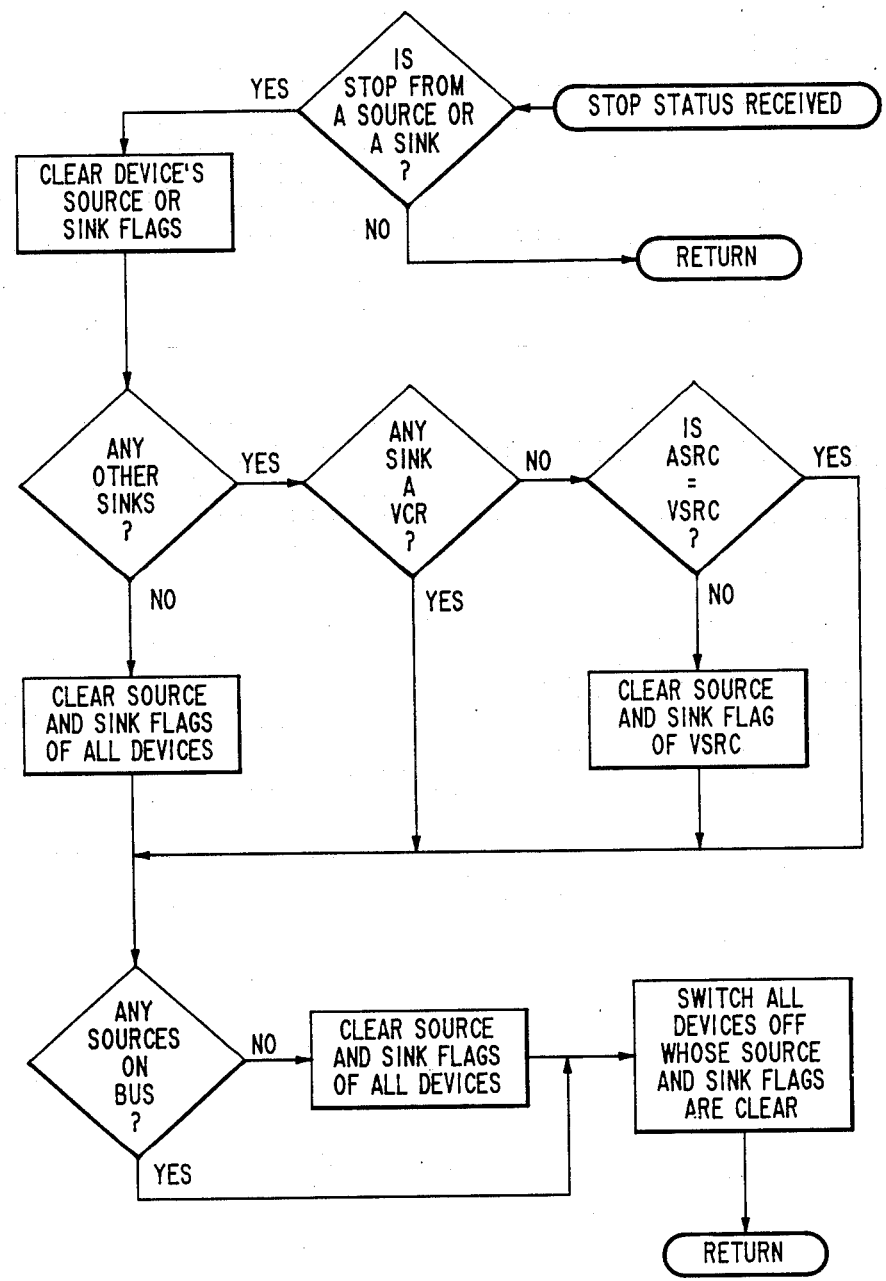
FIG. 2 is a flow chart illustrating operation of the system of FIG. 1 in accordance with the invention.

In accordance with another aspect of the invention, the ROM portion of memory 62 (which may be internal to controller 60 as previously noted) includes the program illustrated in FIG. 2. Advantageously, this program, in combination with the previously noted status messages, enables the system to automatically turn off the power in a coordinated fashion for the numerous possible recording configurations previously noted without the danger of inadvertently interrupting a recording for one configuration as power is removed from another configuration. As an overview, for tape-to-tape recording (dubbing) the controller will "power-down" both the recording signal SOURCE component and the recording SINK component (i.e., the recorder making the recording) if either component runs out of media (e.g., recording tape). This is accomplished by controller 60 which examines the status messages when the message STOP is received from a component and determines if the recording is being made by a single component having one or more recording signal sources. If STOP is received from the recorder, controller 60 will transmit a power-off command to each source supplying signal to the recorder and to the recorder itself. A more complex situation is where two or more recorders are connected to receive recording signals from a common source, as for example, where TV receiver is connected to supply audio and video signals to VCR 20 and to supply audio signals to audio tape recorder 16. In this case if the audio recorder runs out of tape and stops, controller 60 will respond to the STOP message by sending a POWER-OFF command only to the audio recorder thereby allowing continued recording of the TV receiver. A third operating mode is exemplified by the case where VCR-20 is connected to supply recording signal to VCR 22 and to audio recorder 16 and the source component (VCR 20) runs out of tape. In this case controller 60 responds to the STOP message by supplying a POWER-OFF command to VCR 20, VCR 22 and audio recorder 16.

The foregoing examples will now be discussed in more detail with reference to the flow chart of FIG. 2. Assume, as a first example, that the system is configured to record a TV simulcast with video from TV 10 and audio from tuner 18 on a single recording device (e.g., VCR 20). The program begins when controller 60 detects a STOP status message on bus 32. In response thereto controller 60 checks the recording identification flags to determine if the stopped device is a device selected as a recording signal source or sink component. "Sink" as used herein means a recorder that does the recording. If STOP was not from a recording source or sink, controller 60 exits the program otherwise it clears the components flags. Later, as will be explained, devices (components) with cleared flags are turned off as the last program step.

Controller 60 next tests the status messages to determine if there are any other SINKS active in the system (i.e., recorders other than the device whose sink or source flag was just cleared). In this example the recorder VCR 20 is stopped and so its flag is clear and there are not other SINKS (recorders recording) so the test is NO. Controller 60 than clears all sink and source flags, in this case the SOURCE flags for TV 10 and tuner 18 and performs a test to see if any sources are on the bus. In this case receiver 10 and tuner 18 are on the bus so controller 60 enters the last program step of transmitting a POWER-OFF command to TV 10, tuner 18 and VCR 20 and returns to the main program.

Next will be considered an example of where two recorders (VCR 20, tape recorder 16) are recording the output of a single source (e.g., TV 10). For this case the program allows one recorder to continue when the other runs out of tape. Assume that VCR 20 is out of tape and sends a STOP message to controller 60. The program, as before, clears the STOP flags of recorder 20 but since recorder 16 is still recording the "Other Sinks" test result is YES. Next a test is made to see if any of the two sink devices is a VCR. The test result is NO because the VCR flag was previously cleared. The next text determines if audio and video signals are from the same source (ASRC=VSRC). In this case they are (i.e, both are from TV 10.) so the result is YES. Next the "any sources on bus" text is performed and the result is YES because TV 10 is still on. In the final step controller 60 transmits a power-off command to VCR 20 (whose flag was cleared) while allowing TV10 and audio recorder 16 to continue recording (flags not cleared).

As a further example, assume now that VCR 22 was the source rather than TV10 in the previous example and that VCR 22 ran out of tape rather than VCR 20. In this case the program will first clear the VCR 22 flag, then it will clear the flags of all sink devices VCR 20 and audio recorder 16. For this case controller 60 will then transmit a POWER OFF command to all devices (VCR 20, VCR 22 and recorder 16).

What is claimed is:
1. A component audio/video system, comprising:
system controller means having an input/output port connected to a plurality of audio/video components via a bidirectional data bus for supplying selection commands and control commands thereto;
signal switching means responsive to said selection commands transmitted by said system controller means via said bus for selectively interconnecting audio and video inputs and outputs of said audio/video components;

status transmitting means in said components for transmitting status messages via said bidirectional bus to said system controller means indicative of which of said components are selected for operation and the operating mode thereof, said messages identifying components selected for recording and components selected for supplying signals to be recorded, said messages including a stop status message indicating that a component selected for supplying a signal to be recorded has finished supplying said signal to be recorded and a stop status message indicating that a component selected for recording has run out of recording medium;

said system controller means being responsive to said messages for, in a first operating mode, transmitting a power-off command to each single recording component and to each associated recording signal source supplying recording signal to said single recording component in response to a stop status message produced by any of the components, and for, in a second operating mode, transmitting a power-off command to one of two or more recording components receiving recording signal from a common recording signal source in response to a stop status message produced by said one recording component.

2. A component audio video system as recited in claim 1 wherein said system controller means, in said second mode of operation, transmits a power-off command to said common recording signal source and to each one of said two or more recording components in response to a stop status message being produced by said common recording signal source.

3. For use in a component audio/video system including a plurality of source components for supplying audio or video signals or both and one or more recording components for recording supplied signals, signal coupling means including signal switching means for selectively interconnecting inputs and outputs of said components in response to control signals, said components receiving said control signals for controlling the operation thereof and supplying status signals indicating the operating modes of said components, said status signals including a stop status signal indicating that a respective recording component selected for supplying a source signal has finished supplying said source signal or indicating that a respective source component selected for recording a source signal has run out of recording medium, said control signals being received and said status signals being supplied via a data bus, apparatus comprising:

control means for generating said control signals, said control means generating control signals for causing said switching means of said coupling means to selectively interconnect one of said source and recording components in one of a plurality of selectable different configurations and for initiating the operation of the components of the selected configuration to record one or more of said audio or video source signals, said control means generating control signals for causing the termination of the operation of predetermined ones of the components of said selected configuration in response to a stop status signal generated by at least one of the components of said selected configuration and in accordance with the selected configuration.

* * * * *